J. BURT.

Carriage-Seats.

No. 5,767.

Reissued Feb. 17, 1874.

WITNESSES.

W. T. Newman,

Wm. H. Brereton Jr.

INVENTOR

John Burt,
Alonzo F. Hubbell,
Edwin R. Williams
Assignees.

By Leggett & Leggett
Attorneys.

AM. PHOTO-LITHOGRAPHIC Co. N. Y. (OSBORNE'S PROCESS.)

UNITED STATES PATENT OFFICE.

JOHN BURT, OF SANDUSKY, OHIO, ASSIGNOR, BY MESNE ASSIGNMENTS, TO ALONZO F. HUBBELL AND EDWIN R. WILLIAMS.

IMPROVEMENT IN CARRIAGE-SEATS.

Specification forming part of Letters Patent No. 70,517, dated November 5, 1867; reissue No. 5,446, dated June 17, 1873; reissue No. 5,767, dated February 17, 1874; application filed December 27, 1873.

*To all whom it may concern:*

Be it known that JOHN BURT, formerly of Sturgis, Michigan, but now of Sandusky City, county of Erie, State of Ohio, did invent a certain Improvement in the Method of Constructing Vehicle-Seats; and the following is declared to be such a full, clear, and exact description thereof as will enable others skilled in the art to which it pertains to make and use it, reference being had to the accompanying drawings forming a part of this specification.

This invention relates to improvements in the method of constructing carriage-seats; and consists in making seat backs and sides, of that kind that recline or flare outward from the base to the top, from a single piece of material that will bend, and in one continuous length, in the manner hereinafter set forth.

Figure 1:
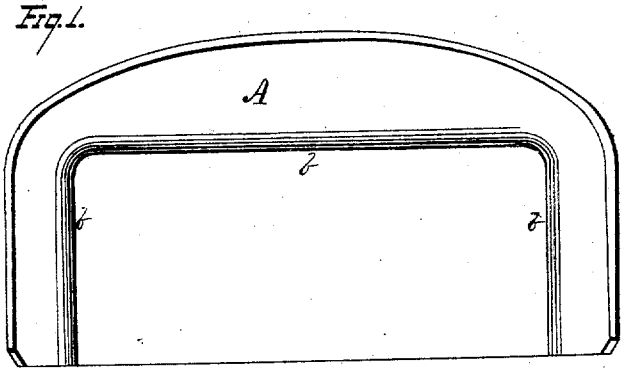
Figure 2:
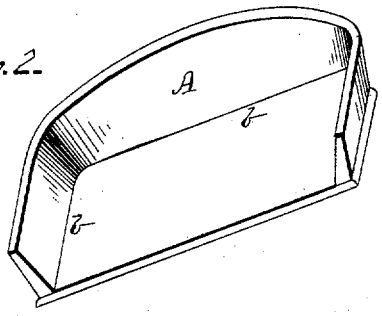
Figure 3:
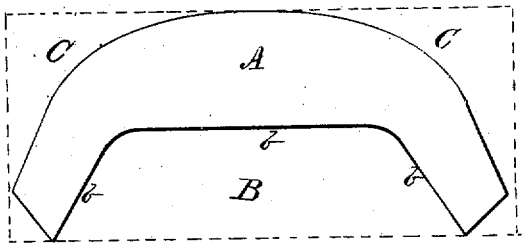

In the drawings, Figure 1 is a plan, and Fig. 2 a perspective, view of a carriage-seat embodying this invention. Fig. 3 is a representation of a developed seat back and sides, showing the trapezoidal piece that is cut from the middle of the under side of the material before bending, in order to communicate the desired flare or recline to the arms and back.

In order to produce the seat back and sides with the desired flare or recline in a continuous unbroken length, a flat piece of material, A, of suitable dimensions, is used, and from the under side thereof a trapezoidal piece, B, is cut; and, generally, the upper corners C are trimmed off, so as to give to the seat back and sides something like the shape they are ultimately to assume. The material thus prepared is then placed into a bending-machine or other suitable device, and the flare or recline is given to the back and arms by the bend, and the absence of the trapezoidal piece B permits the edges *b b b* to come into the plane of the seat at right angles to each other.

Having thus described this invention, what is claimed as new, and desired to be secured by Letters Patent, is—

The within-described process of making a bent and reclining carriage-seat back and sides in a continuous length from a single piece, A, of material that will bend, the piece A having been prepared previously to bending by cutting a trapezoidal piece, B, from the under side thereof.

ALONZO F. HUBBELL.
EDWIN R. WILLIAMS.

Witnesses for HUBBELL:
JNO. R. MINER,
C. M. COOK.
Witnesses for WILLIAMS:
J. F. SEXTON,
MASON ROCKWELL.